United States Patent [19]

Auspurg et al.

[11] 3,792,439

[45] Feb. 12, 1974

[54] STORAGE ARRANGEMENT FOR PROGRAM CONTROLLED TELECOMMUNICATION EXCHANGE INSTALLATIONS

[75] Inventors: Heinz Auspurg; Dieter Holzerlandt, both of Munich; Hannes Jaeger, Icking; Peter Kern, Munich; Hans-Ulrich Moder, Munich; Rolf Schubert, Munich; Hans Bittermann, Munich; Josef Huber, Munich; Bernhard Schaffer, Munich, all of Germany

[73] Assignee: Siemens Aktiengesellschaft, Berlin & Munich, Germany

[22] Filed: Aug. 6, 1970

[21] Appl. No.: 61,692

[30] Foreign Application Priority Data

Aug. 19, 1969 Germany .................. P 19 42 189.7

[52] U.S. Cl. .......................................... 340/172.5

[51] Int. Cl. .......................................... G06f 9/18

[58] Field of Search .................................. 340/172.5

[56] References Cited

UNITED STATES PATENTS

| | | | |
|---|---|---|---|
| 3,252,149 | 5/1966 | Weida et al. | 340/172.5 |
| 3,317,898 | 5/1967 | Hellerman | 340/172.5 |
| 3,348,210 | 10/1967 | Ochsner | 340/172.5 |
| 3,409,877 | 11/1968 | Alterman et al. | 340/172.5 |
| 3,419,849 | 12/1968 | Anderson et al. | 340/172.5 |
| 3,496,551 | 2/1970 | Driscoll et al. | 340/172.5 |
| 3,503,048 | 3/1970 | Avsan et al. | 340/172.5 |
| 3,566,357 | 2/1971 | Ling | 340/172.5 |
| 3,566,360 | 2/1971 | Stollman et al. | 340/172.5 |
| 3,390,379 | 6/1968 | Carlson et al. | 340/172.5 |
| 3,483,520 | 12/1969 | Broderick et al. | 340/172.5 |
| 3,505,651 | 4/1970 | Barlow et al. | 340/172.5 |
| 3,551,892 | 12/1970 | Driscoll, Jr. | 340/172.5 |
| 3,560,937 | 2/1971 | Fischer | 340/172.5 |
| 3,638,199 | 1/1972 | Kolankowsky et al. | 340/172.5 |
| R27,285 | 2/1972 | Dreyer et al. | 340/172.5 |

*Primary Examiner*—Paul J. Henon
*Assistant Examiner*—Melvin B. Chapnick

[57] ABSTRACT

A message exchange system for binary data signals wherein circuit means are provided for subscriber interconnection as well as computer interconnection. Storage means are provided for the data and programs needed for operating the exchange. A storage unit containing a plurality of storage sub-units is assigned to several data processing units in such a way that each processing unit has an individualized program control. Each of the processing units may be connected individually to a separate storage sub-unit. The aforementioned program control may be controlled either by permanently wired commands or commands in the storage means.

7 Claims, 10 Drawing Figures

STORAGE SUB-UNIT

STORAGE ARRANGEMENT FOR PROGRAM CONTROLLED TELECOMMUNICATION EXCHANGE INSTALLATIONS

BACKGROUND OF THE INVENTION

The invention is related to a centrally controlled, storage programmed message processing system, and in particular a message exchange system for binary signals, wherein there are provided circuit arrangements for the connection of the subscribers among themselves, and for interconnecting control-and calculator circuits. Such systems include storage arrangements interacting therewith, which contain the data and programs necessary for the operation of the exchange.

There is already known a process for the processing of messages in data dial exchange systems with central control wherein, under the influence of the control, a central storage having assigned thereto an address location, and containing the assignment between the transmitters and the receivers, switches the changes in state of the binary messages from the transmitters to the receivers. The receivers are identified by binary code words, so that the central store contains all data and programs necessary for the operation of the exchange.

Further, there has already been suggested a telegraph exchange system wherein a central control only switches the changes in state within binary messages from transmitters to receivers identified by binary code words according to the waiting process (see for example German Publ. Pat. No. 1,298,114). The term waiting process, as used herein, refers to the known technique by which simultaneously received signals on separate incoming lines are sent successively from the exchange to the desired subscriber lines. For this there is available in the central control a location-addressed central store, reachable over input-code-transducers and input-code multiples, wherein to each transmitter a specific storage cell is assigned. This cell contains, for example, at the end of the connection establishment a receiver address, formed of the dial information, further data about the transmitter, and data for the operation of the system itself. It is an advantage of this exchange system that all data necessary for the connection can be programmed and can be present in the form of a program schedule in the central store.

According to further suggestions, in the operation of such an exchange system the arriving polarity changes or changes in the polarity of the message signal caused by changes in the message content are recognized as portions of a signal or as portions of a message. If the arriving polarity changes are portions of signals, they are connected with preceding or succeeding polarity changes of the same transmitters and are processed further according to the program of the central control. However, if the polarity changes pertain to a message, they are immediately forwarded to the receivers specified by the receiver address. The reception and recognition of signals in another prior art system takes place according to the time comparison process. For this the points in time of the arrival of a first polarity change, as well as the direction thereof, are noted in a cell of the central store, assigned to the transmitter. The points in time of all polarity changes arriving later, as well as the directions thereof, are then also stored into this cell, so that in a known code the arriving signal is recognized by timely referral to the point in time of the first polarity change. The polarity changes arriving in series are available for this operation in parallel in the storage cell assigned to the transmitter in question. Polarity changes which were recognized in this manner as signals can then either be processed within the central control into new signals, or can be forwarded directly. The transmission of such signals takes place in the same manner as the transmission of messages, i.e., over the output-code multiple and the output-code transducers, which in turn corresponds to a parallel-series conversion.

It is therefore, an object of the invention to provide an exchange system which is adaptable to a growing number of subscribers to be connected with only slight preliminary efforts, whereby not only a broadening of the system per se, but also a broadening of the scope of the system is to be effected in a simple manner by degrees. In this regard it is important to be able to connect subscribers with low transmission speed (telegraph subscribers) as well as subscribers with the higher transmission speeds (data centers).

SUMMARY OF THE INVENTION

The aforementioned and other objects are attained according to the invention through the fact that a division of the system into at least one storage unit and into several processing units connected therewith is provided in such a way that the processing units in each case contain an individual program control arrangement which is controlled through commands permanently wired and/or existing in the storage unit, and that each unit has a predetermined function which may differ from that of the other processing units.

According to a further development of the invention it is provided that the subscriber - and connection lines to other exchanges or concentrators, are combined in groups into at least one line connection unit. The line connection unit contains, an individual program control, in addition to system connection circuits and the transmission network, which may, for example, be an asynchronous combination multiple, consisting of a code transducer, finder and distributor circuits. The line connection unit is connected with the storage unit through several connection channels.

Suitably the division is done in such a way that in addition to a place-addressable storage unit with individual program - and input/output control and at least one line connection unit, at least one program control unit is provided which is controlled predominantly by commands contained in the storage unit, and that further a command unit is provided, containing means necessary for the input of programs, output of reports, testing and service by personnel. By the addition of further processing units and broadening of the storage unit - as will be described later - the system can be broadened in simple manner.

Thus in the message exchange system in question these exists — the same as in large electronic data processing installations — the difficulty to connect operating storages with great caacity, for example in the order of magnitude of a megabit and with very short cycle time (shorter than 500 ns). As it is very difficult to develop core storages for this purpose consisting of one block and possessing thereby the required signal capacity at the required short cycle time, it is necessary to compose operating storages out of a plurality of storages. According to a further development of the inventive thought the object is solved at low requirements in transmission channels by connecting a number of processing units with a storage consisting of a number of core storages through the fact that in each case several storage blocks, in particular core storages are combined with a control unit into a storage sub-unit, and that in each case a direct connection path is provided from individual processing units over an input circuit of the storage input/output control to several storage sub-units, and that further the connection paths can be established over a selection circuit.

According to the invention it is provided in detail that over a selection circuit of the storage input/output control in each case a direct connection path to several storage sub-units is intended, and that further, over a selection circuit, connection paths to further storage sub-units can be established.

Suitably the input and output circuits as well as the input and output selection circuits are combined into a control unit for quite a number of storage sub-units, to which each processing unit is connected by an input- and an output channel. Thereby as many further input and output channels are provided from the storage sub-units to the control unit as storage sub-units exist. Thus if n-processing units and m-storage sub-units exist, the number of the channels to the storage sub-units and processing units from the control unit is $n + m$.

Thereby it becomes possible according to the invention to reach the storage sub-units in a short access time, in that from a storage request control contained in the storage input/output control the selection and distribution of the storage cycles requested by the processing units is controlled in such a way that in several storage units cycles proceed simultaneously. The beginning of each storage cycle is spaced from the beginnings of adjacent cycles by a time interval $t$. Thus, if a first storage cycle is allocated to an arbitrary first processing unit, then a second storage cycle can be allocated to a second processing unit after a time $t$, whether or not the first storage cycle has ended.

A preferred embodiment of the invention is characterized by the fact that in the storage input/output control the input - and output circuits are developed in such a way that several, preferably four, simultaneously through-connectable connection paths for information input and information output are provided.

BRIEF DESCRIPTION OF THE DRAWINGS

A preferred embodiment of the invention is described hereinbelow in conjunction with the drawings in which:

In FIG. 1 VE designates in each case processing units of the system which process independently specific tasks within the system and interact with a central storage S, whereby for the different units VE and programs, different priorities are fixed. The store S is described hereinbelow in conjunction with FIGS. 3 through 5. Individually, L designates the line connection unit, which will be explained in more detail later with the aid of FIG. 2. Line connection unit L is one of several types of processing units VE which can be used, as will be discussed hereinbelow.

Further, additional processing units VE are provided, of which K designates the command unit which makes it possible for a service person to intervene in the operation of the exchange system. Command unit K for example serves to connect, data viewing apparatus, perforated tape apparatus, and contains lamp- and pushbutton fields. Over command unit K new programs can be entered into the system and already existing programs can be changed.

The program control itself is carried out by two program control units, in the shown working examples designated P1 and P2. Program control units P1 and P2 can be effective simultaneously. It is possible, however, to provide only one single program control unit. The operation can also be developed in such a way that the program control unit P2, upon dropping out of program control unit P1, can take over the entire operation, in a given case at a decrease of the operational speed, and during normal operation both program control units P1 and P2 are effective, whereby a speedier mode of operation of the entire system is made possible. The programs themselves are, insofar as they are not existing in permanently wired manner in the individual units, stored in core storage S, the same as specific commands.

Further, as a further processing unit the signal treatment unit Z is provided which contains relatively few but continuously needed permanently wired programs and which interacts with program control unit P1 and/or P2. Finally an apparatus connection unit G is provided, which contains control and connections for external apparatus, for example circulating storages and the like for storage of charges, etc. The minimum equipment of the system can embrace, in addition to a storage unit S and a line connection unit L, only a program control unit P and a command unit K as further processing unit VE. Each of the various types of processing units described hereinabove are of known construction and are like those found in conventional data processing systems.

Figure 2:
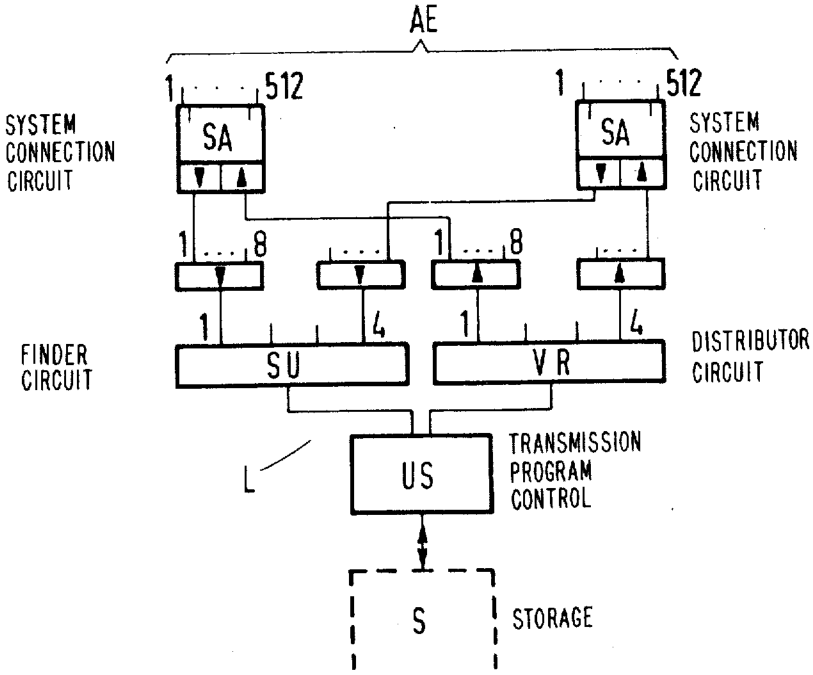
FIG. 2 is a block circuit diagram of the line connection unit as it is used within the system as shown in FIG. 1.

In FIG. 2 the line connection unit L is shown as block circuit diagram. A line unit of this type is already the object of an earlier filed, commonly assigned patent application Ser. No. 71,675. The line connection unit forms no part of this invention and accordingly is not described in detail herein. In FIG. 2, SA designates system connection circuits to which the subscriber connection circuits AE of the subscribers, for example 1 . . . 512, are connected. The system connection circuit SA contains input- and output code transducers, which convert signal changes arriving on the connection lines from the subscribers, from further exchange stations, and in given cases from remotely controlled concentrators, into a binary bit series on parallel lines, or, after re-conversion, again transport them to the outlets. The transmission program control US, which interacts with finder circuit SU and distributor circuit VR, transmits, with simultaneous interaction with storage S, the desires for connection emanating from the connection circuits and represents the asynchronous combination multiple, known per se (see for example German Pat. No. 1,255,704). Line finder circuits and distributor circuits are well known in telecommunication switching technology, and it is contemplated that such conventional components be used herein.

Figure 1:
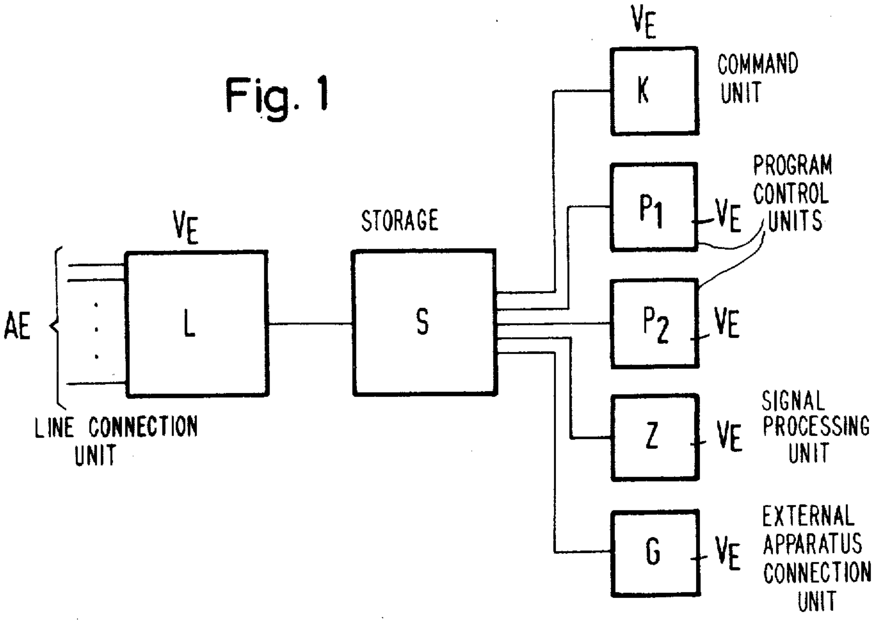
FIG. 1 is a block circuit diagram of the structure of a data exchange system according to the invention.

As has already been stated, the system shown as working example in FIG. 1 is characterized according to the invention through the fact that it is composed of problem-oriented units. The store forms one unit, while other units, which are also designated as processing units (in FIG. 1) VE, process specific problems independently, so that it is possible to add further processing units VE in a further expansion of the system. For example the number of line units L can be easily increased with the growing number of subscribers to be connected if care is taken that storage unit S is developed accordingly. In the following storage unit S, is discussed, and it must be expandable according to the number of processing units VE to be connected, in particular the number of line units L to be connected, corresponding to the number of connected subscribers.

In large exchange systems of the described type there exists the difficulty that a large number of storage locations must be provided, which must be attainable within a short cycle time, for example shorter than 500 ns. As according to the present state of the art, and very likely in the future, it is hardly possible to develop core storages which possess, combined in a block, a great capacity, for example in the order of magnitude of a mega byte, and at the same time make possible the required short cycle time, one is forced to combine the operation store of a plurality of core storages. The invention now shows a way to effect the sub-division of such a large-scale storage as economical as possible and in a manner that quick access to the individual storage blocks is possible. Several ways are possible in this connection.

In the following an especially advantageous working example of the invention is described with the aid of FIGS. 3 – 5. It is a prerequisite that access to the operating storage block, or to the sub-units constituting the operating storage, takes place in a cyclic manner, i.e., per cycle to be allotted it is decided which processing unit VE gets access to the operating storage S (FIG. 1). This decision is made in a storage request control which forms a part of storage S. In FIG. 3 the storage unit is again designated S. This contains a storage input/output control SEAS, which possesses connection channels extending toward the exterior to the processing units VE1 . . . VEn. Towards the interior there are connections to storage subunits SB1 . . . SBm. In FIG. 5 the individual registers and circuits are shown, in the form of a block circuit diagram, of which control SEAS is composed. According to FIG. 3 the storage input-output control SEAS contains an input circuit A to which processing units VE1 . . . VEn and storage sub-units SB1. . . SBm are connected. Connection takes place over the lines designated by a, which serve for information input, i.e., address, operation, word input. From the direction of processing units VE n-lines *a* lead to input circuit A, while m-lines lead from input circuit A to the storage sub-units SB. Further, control lines c for input are provided, over which for example the cycle request and the forwarding of the storage sub-unit address takes place. Control lines c on one hand lead, from the direction of the processing unit VE in question to input control AS, and there to input selection circuit AA which is connected with the input destination circuit AZ. The input destination circuit AZ in turn is connected over control lines with storage sub-units SB, i.e., over m-control lines, corresponding to the number of storage sub-units.

Information out put takes place over lines b from the storage subunits through the storage input/output control SEAS to processing units VE. There are provided thereby, corresponding to the number of processing units VE1 . . . VEn, in each case *n* - information output lines *b*, over which word output takes place, which emanate from output circuit B. There are further provided for output, control lines d which are connected from the output destination circuit BZ to the processing units VE1 . . . VEn. The output destination circuit BZ is in interaction with output selection circuit BA, which receives from storage sub-units SB, over control lines D, the output control signals, for example output request signals. Information output takes place over lines b from storage sub-units SB to output circuit B. Input control AS and output control BS are connected by a register R, wherein the condition of seizure of the storage sub-units is contained. Each storage sub-unit SB in turn contains an individual storage operation control SOPS which interacts with the core storages KS1, KS2, etc., of each storage subunit SB. In order to obtain greater reliability it is also possible to provide two storage units S within the system which possess identical contents so that upon the failing of one storage unit the system is able to continue operating. For this purpose both storage units S can be operated synchronously, in that from the processing unit VE synchronization is established in each case through time-bound mode of operation in the case of cycle requests and selection. To maintain synchronization and simultaneous ability to compare information in the processing unit VE in question a no-load cycle, which is of no importance as far as information is concerned, can be wound in the storage unit not addressed in each case.

Figures 3, 3A:
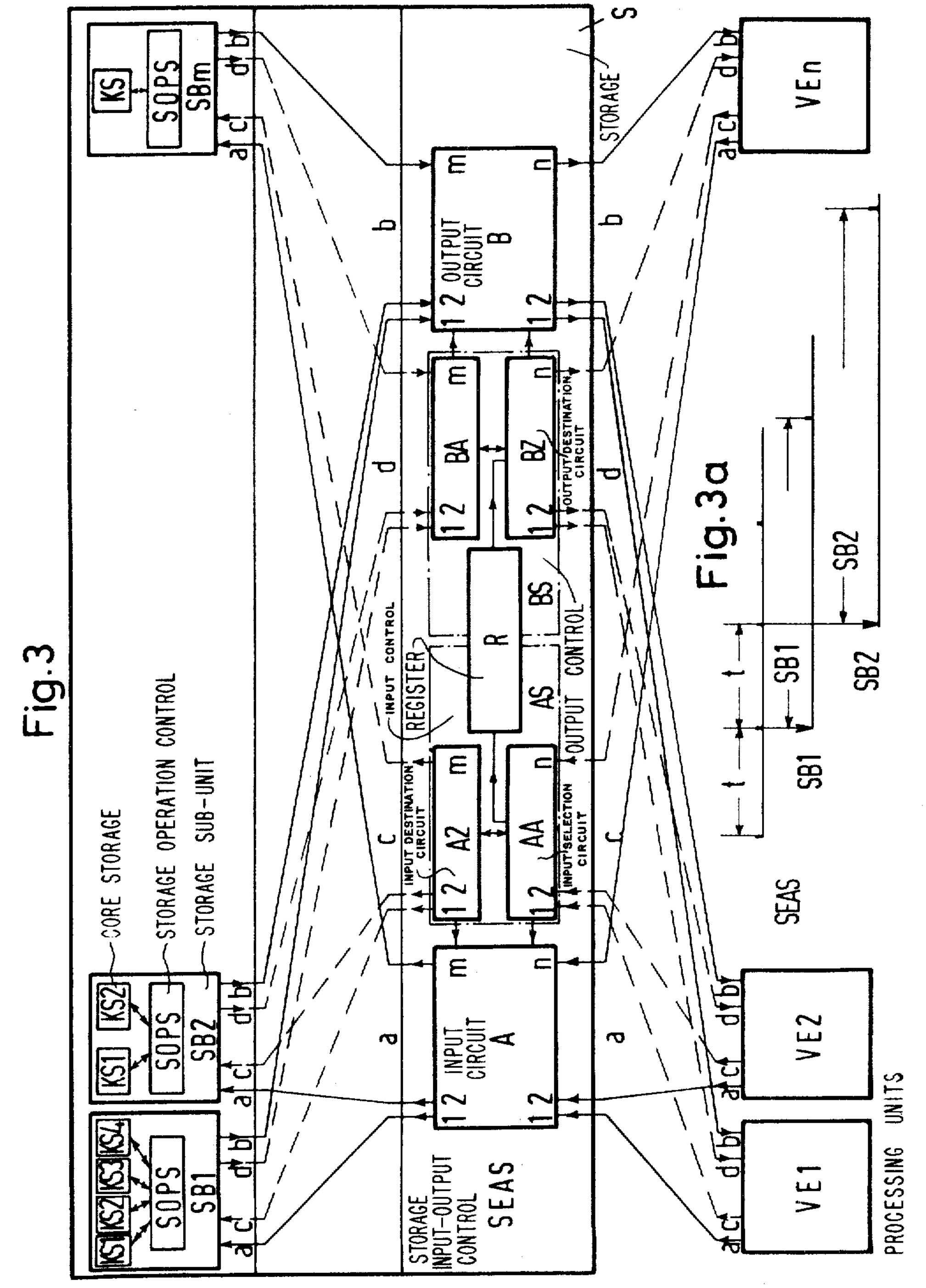
FIG. 3 is a block circuit diagram of a storage unit as a working example of the invention.
FIG. 3*a* is a time diagram to explain the mode of operation.

The operation of a storage unit S, which according to FIG. 3 is sub-divided into several storage sub-units SB, is carried out over the storage input/output control SEAS which carries out a selection and distribution of the cycles from the processing unit VE to storage sub-units SB. Now according to the invention it is possible to simultaneously run several cycles, as is explained in FIG. 3*a*. In FIG. 3*a* the processing time of the storage input/output control SEAS is designated by *t*, after which in each case a new cycle can start. The shorter the processing time *t* is in relation to the cycle time in the storage sub-units, the more cycles can be spaced timely into each other. The beginning of each cycle is in each case spaced by the processing time interval *t*. The storage sub-units SB1. . . SBm themselves can have different cycle times; they only have to be adapted to the operating screen (time interval t of storage input-/output control SEAS), i.e., the effective cycle time of a storage sub-unit suitably always is a whole multiple of time *t*, as is shown in FIG. 3*a*. There the cycle duration of storage sub-unit SB1 is taken to be shorter than that of storage unit SB2, whereby however, the cycle duration of storage unit SB1 is three times time interval *t*, while the cycle duration of the storage sub-unit SB2 might be four times the time interval *t*.

A storage sub-unit SB contains a storage operation control SOPS, as is evident from FIG. 3 and one or more core storages KS. The storage sub-units are uniform towards the storage input/output control SEAS and are connected with control SEAS by a storage-standard intersection point. In contrast the intersection point between storage operation control SOPS and the thereto pertaining core storages is adapted to the used core storages themselves, since the core storages can possess different properties with regard to operation organization, cycle time, circuit tehcniques, etc. The capacity of a storage sub-unit depends on the core storages used in each case, for example in a single storage sub-unit 32 KW can be combined with four bytes in each case. However, it is also possible to connect a storage sub-unit with lower capacity to the system, if, for example an only partially developed storage sub-unit is to be enlarged later. In these cases the storage unit has a gap in its address sequence.

Figure 4A:
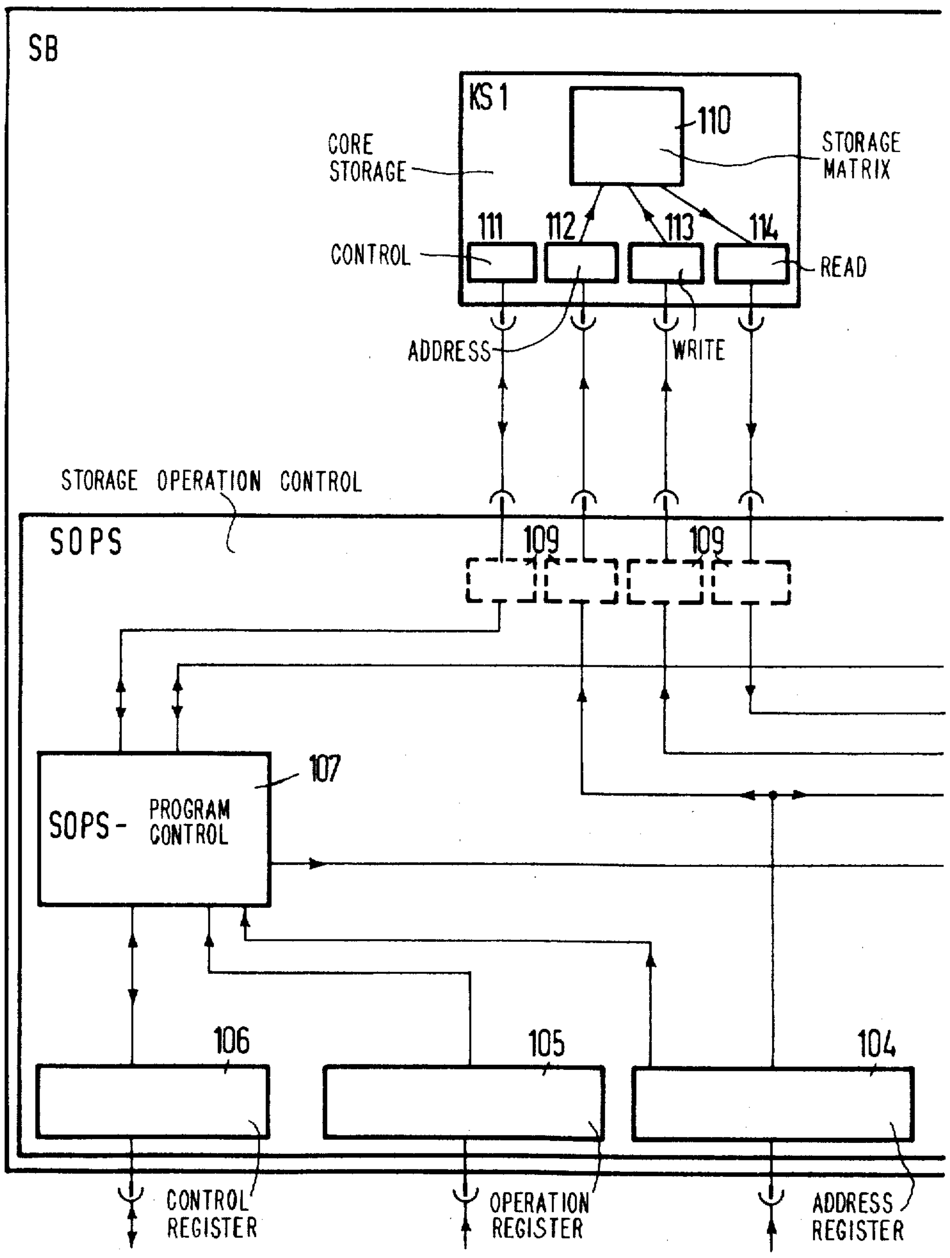
FIG. 4 consisting of FIGS. 4*a* and 4*b* is a block diagram of a storage sub-unit used in the invention.
Figure 4B:
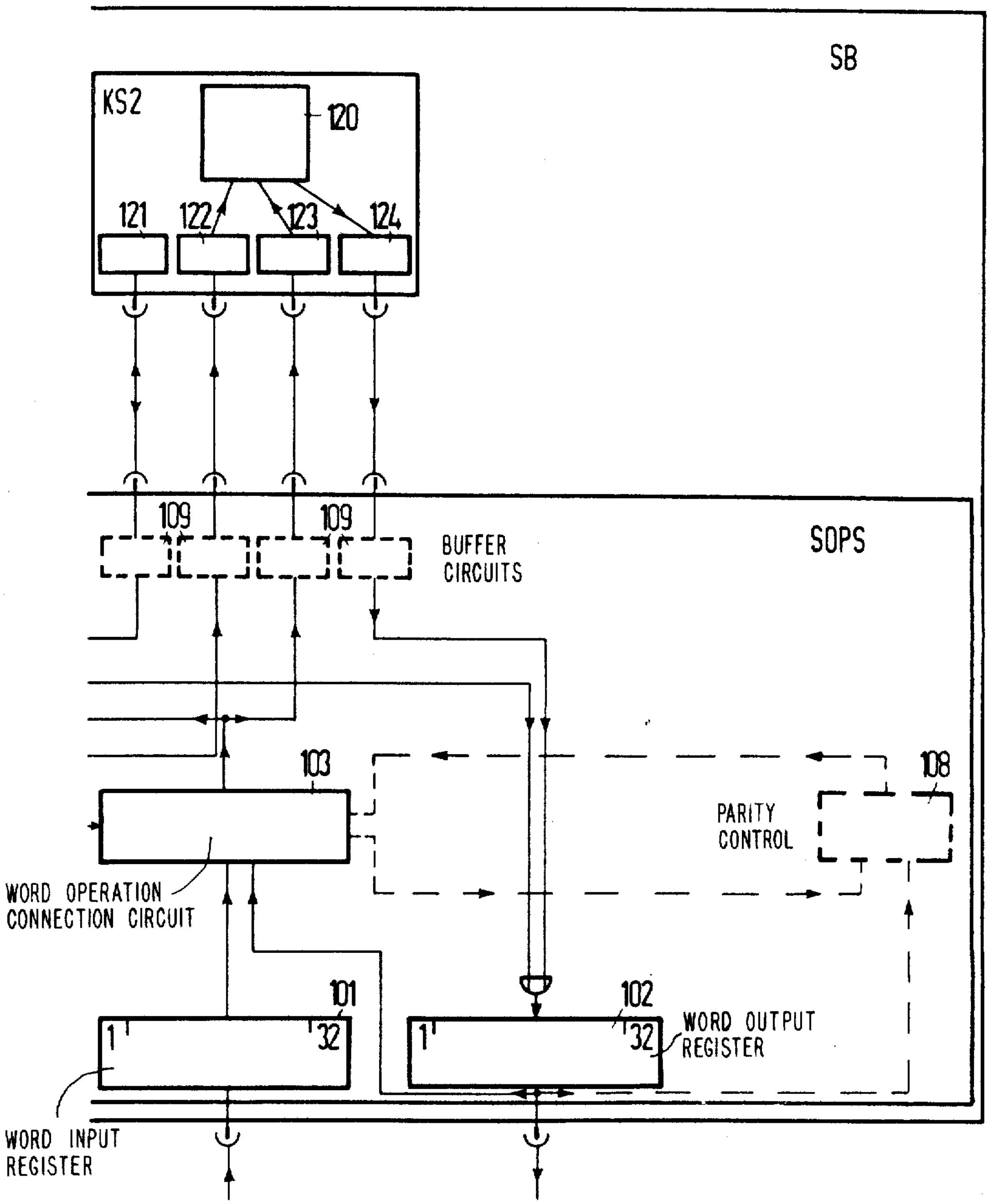
Figure 5A:
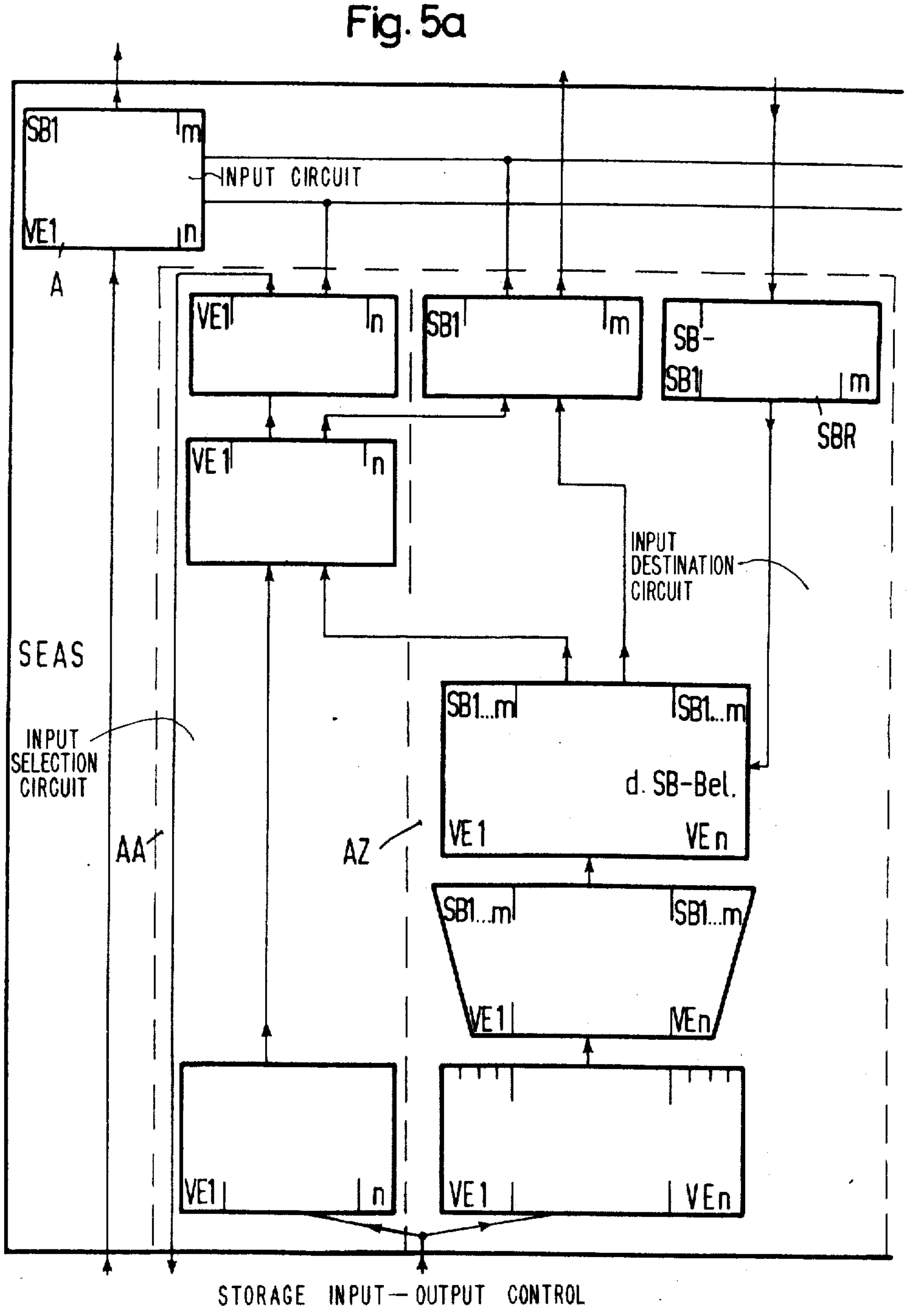
FIG. 5 consisting of FIGS. 5*a* and 5*b* is a block diagram of the input/output control for a storage unit.
Figure 5B:
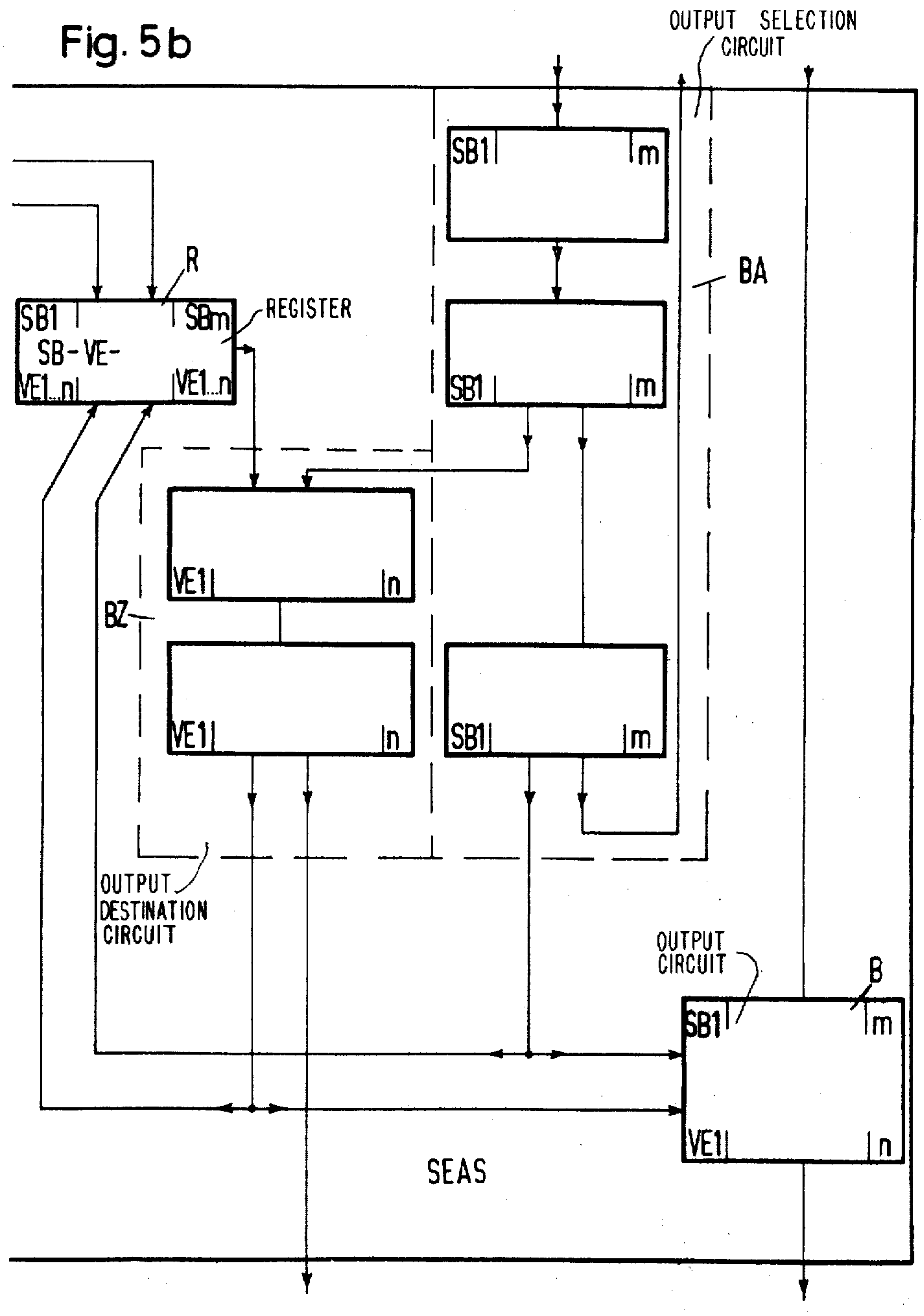

FIG. 4 shows a working example for a storage sub-unit as block circuit diagram. Thereby two core storages KS1 and KS2 are shown which are controlled by a storage operation control SOPS. The structural details regarding core memories are well known to those skilled in the art, and it is contemplated that such conventional core memories be used herein to form the aforementioned core storages. Each core storage KS1 and KS2 contains a storage matrix 110, 120, an address part 112, 122 (switching matrix, driver stages), a writing part 113, 123, a reading part 114, 124 and a control part 111, 121 for the generation of cycle control signals. Core storages KS1 and KS2 are connected with the storage operation control SOPS through cables which can be short due to the restricted size of a storage sub-unit, so that only short signal travel times occur. Now the storage operation control SOPS of the shown working example is organized in such a way that the two core storages KS1 and KS2 result in a doubling of the capacity at equal word legnth. Thus core storage KS1 contains 1 . . . 16 KW, core storage KS2 17 . . . 32 KW. To decide whether a cycle is to proceed in core storage KS1 or in core storage KS2, the highest-value bit of the storage address which was conveyed from the processing unit requesting cycles, through the storage input/output control SEAS, to the storage sub-unit, is considered.

The storage operation control SOPS in the illustrated preferred embodiment comprises a word input register 101, a word output register 102, and a word operation combination register 103, lying between the latter two registers. Each of these registers is of conventional construction as is denoted by the term register. The register 103 contains in addition, logic circuits of known construction for carrying out logic operations on words to be entered into the core storage. That is, in the known manner, the register 103 can carry out AND-/OR operations with a word to be entered in the core storage and with a word being fed out in the same storage cycle, the latter operations being carried out before the former word is entered. The storage operation control also includes an address register 104, an operation register 105 and control register 106 for the intersection point from and to the storage input-output control SEAS. A control circuit 107 coordinates the processes in a storage sub-unit (SB). The control circuit receives control signals, such as a cycle start signal or a word combination signal, these control signals being transmitted by the storage input-output control and received in register 103 over the control register 106. The reception of these control signals by control circuit 107 causes the desired operation in core stores KS in connection with the given operation and address information. In view of the fact that the core storage units are of conventional construction, it can be assumed that the control circuits which operate with these core stores are similarly well known. That is, as is known, in order for core storages to communicate with and perform logical operations with data processing circuitry control circuits of this type must be used, and these are of known construction. A buffer element 109 of known construction is provided in order to adapt the signals from one core storage unit to the signal requirements of another core storage unit. As is known, core storages of slightly different construction may have different signal requirements and outputs, and it is contemplated that appropriate signal adaptation circuitry be used in order to allow such differing core storages to be operated together. The particular type of adaptation circuit used will depend on the particular type of core storage used, and of course, upon the signals used by these various core storages.

The internal structure of a storage sub-unit SB is independent from the structure of the entire storage unit S or the entire system. It is thus possible to combine a storage word from the contents of several simultaneously (parallel) called core storages. With the use of several core stores KS in a storage sub-unit, it is possible to make up the word length or the number of words or the word length and the number of words combined from several core stores. Using two core stores, KS1 and KS2, therefore the first half-word bit 1 . . . 16 can be in the core store KS1, and the second half-word bit 17 . . . 32 can be in the core store KS2, respectively, whereby the individual half-words can be called up in parallel. The word count of a storage sub-unit SB can thereby be increased in that kiloword count (KW) 1 . . . 16 is assigned to the first core store KS1, and the kiloword count (KW) 17 . . . 32 is assigned to the second core store KS2. In this case, only one word is called up with a storage cycle. If, for example, one should use four core stores in a storage sub-unit, then the first two core stores can be provided for word length doubling, and the two other core stores can be provided for word count doubling. Further, it is possible to make up the word length through several successive storage cycles of a core store KS. This can be done, for example, through a cycle 1 in a first cell and a cycle 2 in a second cell of a core store. It is finally possible to carry out the word length through two or more cycles of a core storage, for example cycle 1 in cell A bit 1 . . . 16, cycle 2 in cell A + 1, bit 17 . . . 32. The resulting cycle time of a storage sub-unit then is a corresponding multiple of the actual cycle time of the core storage(s) KS.

Through a storage standard point of intersection the behavior of all storage banks is standardized, i.e., there are determined therefor: maximum possible number of words (to address length), length of word, operation code, circuit technique, time-bound transmission conditions of control and information signals. The cycle times are standardized only through the bond to the operation screen *t* of the storage input/output control SEAS (compare FIG. 3*a*).

It is further possible, beyond the mentioned operating possibilities, to combine the channels of two or more storage sub-units of the storage standard intersection point, for example through parallel selection in the storage input/output control, in order to operate in a given case a storage block with more than 32 KW, for example a slower large-scale storage. There is finally the possibility, for reasons of especially high reliability, to operate within a storage unit S two or even three storage sub-units with identical information in parallel manner, in that in the storage input/output control SEAS a parallel selection is made and to carry out at the storage input/output control an information comparison, for example in the case of three storage sub-units with majority decision. This possibility of redundancy within a storage unit is especially meaningful in small installations where the doubling of the entire storage unit is not desired right away for reasons of cost.

There is finally the possibility of parity control for the securing of data (compare FIG. 4, 108). As through the spaced operation in a storage unit simultaneously cycles proceed, the parity control must in each case be carried out in the storage sub-units. Since the storage sub-units can possess the greatest unreliability relative to other system units, due to the high number of components and their load, the assignment of the parity control to the storage sub-units is necessary, because of the greater probability of error. In the structure of the storage unit according to the invention the possibility is given to carry out the parity control for reasons of security in some storage sub-units only in which especially important informations are stored, whereby advantageously a cost reduction results.

As has already been stated, storage input/output control SEAS controls the traffic from the processing units VE to the storage sub-units SB in storage unit S and vice versa. Referring to FIG. 3, it can be seen that for information input and output from the processing units VE into the storage sub-units SB, or vice versa, the storage input-output control contains an input circuit A and an output circuit B. A path for information is created between the processing units VE and the storage sub-units SB over these input and output circuits.

In order to effect operation of the storage input/output control SEAS as quickly as possible, i.e., with little delay, it is necessary that the processing units VE, together with the cycle request indicate to which storage sub-unit the cycle desire pertains, i.e., the processing units VE must, simultaneously with the cycle request, also supply the address of the storage sub-unit in question. Input control A of the storage input/output control SEAS first carries out, per operation interval *t*, a selection with the input selection circuit AA according to priorities of the requesting processing units VE, whereby the state of seizure of the storage sub-units SB is taken into consideration. Thereby further cycle requests are held in abeyance until seized storage sub-units become free and do not lead in this manner to a blocking and thereby to processing time increases of the entire system. For this reason the state of seizure of the storage sub-units is in each case retained in a storage sub-unit seizure register SBR (shown in FIG. 5) and is taken into consideration in the destination storage sub-unit obtained. Control SEAS supplies per operation interval *t* — if cycle request exist — an input selection and the thereto pertaining input destination and, while in the next following operation interval *t* the control already carries out a new selection, and the information pertaining to the previous selection is put into the destination storage sub-units.

Thus storage unit S operates with multiple time spacing of storage cycles as follows:

a. Storage cycles proceed simultaneously in the storage sub-units SB. Thereby the start is transposed in time in each case by the operation interval *t* of the storage input/output control SEAS, b. The input processes from processing units VE are spaced through the storage input/output control SEAS into the direction to the storage sub-units SB, i.e., per operation interval *t* there occurs one input selection with input destination determination, one information input and one cycle start in one storage sub-unit SB, whereby, in reference to the cycle, these intervals follow one another, in reference to different cycles however, each of these partial processes can be carried out in a "sequence" operation, c. Through the storage input/output control SEAS the output processes from the storage sub-units SB to the processing units VE can be spaced, as will be described in the following.

The storage input-output control SEAS operates to complete an input and output path for information signals over the input and output circuits A and B, respectively, for the storage sub-units under the control of a system pulse. Since the time duration of the system pulse is shorter than the duration of a cycle of the storage sub-units, it is possible that with several cycles running simultaneously in different storage sub-units, several storage sub-units indicate to the storage input-output control at the same time a demand to produce an information output. However, since only one path for an information output is connected under the control of a system pulse, a choice must be made between the various pending information output demands. This choice proceeds according to the priority of the information to be emitted and is under the control of output control BS. The proper priority is assigned to the various storage sub-units desiring to generate information outputs, so that the storage sub-units having short cycle times have a high priority.

The fastest possible mode of operation of the entire system is provided when the cycle requests are greatly distributed onto different storage sub-units SB. Storage unit S then has effect — considered from the direction of processing unit VE - after a build-up process in such a way as if it consisted of one single storage with cycle time t and the correspondingly great total capacity.

It is evident from the preceding description that the system according to the invention represents, in view of its extensive expansion possibilities, in particular of storage unit, S, an especially favorable combination with regard to processing time and cost. In this connection it is also of importance that the storage sub-units SB are connected over so-called standard storage interception points to control SEAS of storage unit S (compare FIG. 3 to FIG. 5). "Standard intersection point" means in addition to a uniform plug-in or clamp-connection of all connections, a uniform form and distribution of the control — and information — signals and a uniform procedure at the intersection point. Further the processing units VE are connected over uniform intersection points to the storage unit S, or its control SEAS, whereby the broadening of the system is made easier.

In the following a working example of input circuit A according to FIG. 3 and FIG. 5 is described with the aid of FIG. 6. The circuit arrangement shown in FIG. 6 of input circuit A makes possible the simultaneous connection of four processing units VE in each case with four storage sub-units SB. In the shown working example the processing units are in each case subdivided into four groups at four processing units VEA1 . . . VEA4, VEB1 . . . VEB4, VEC1 . . . VEC4 and VED1 . . . VED4. However only the connections are marked.

The same is true for the connected storage sub-units. These are sub-divided into four groups, the first of which comprises storage sub-units SBW1 . . . SBW4, the second storage sub-units SBX1 . . . SBX4, the third storage sub-units SBY1. . . .SBY4 and the fourth storage sub-units SBZ1. . . SBZ4. The storage sub-units themselves however are not shown any more, but only the connections suggested.

The connections of the processing units group A are combined over the EXCLUSIVE-OR-Gate GA into a connection path VA, the same is true for the remaining processing units groups B, C, D. Connection paths VA, VB, VC, VD in turn are arbitrarily switchable over further EXCLUSIVE-OR gates GW, GX, GY, GZ to the further four connection paths, VW, VX, VY, VZ, in that to inlets EKAW, EKBW, EKCW, EKDW of EXCLUSIVE-OR gate GW and correspondingly at the other gates, a through-connection potential is placed, which is supplied by input control AS (FIG. 3). The through-connection potentials at inlets EAW1, EAW2, etc. of the EXCLUSIVE-OR gate GA and the remaining gates GW, GC, GD are also supplied by the input control AS, i.e., by input selection control AA. In the through-connection the storage sub-unit SB approached in each case receives — from input destination control AZ, over the thereto-pertaining control line *c* — the command to take over the information.

Figure 6A:
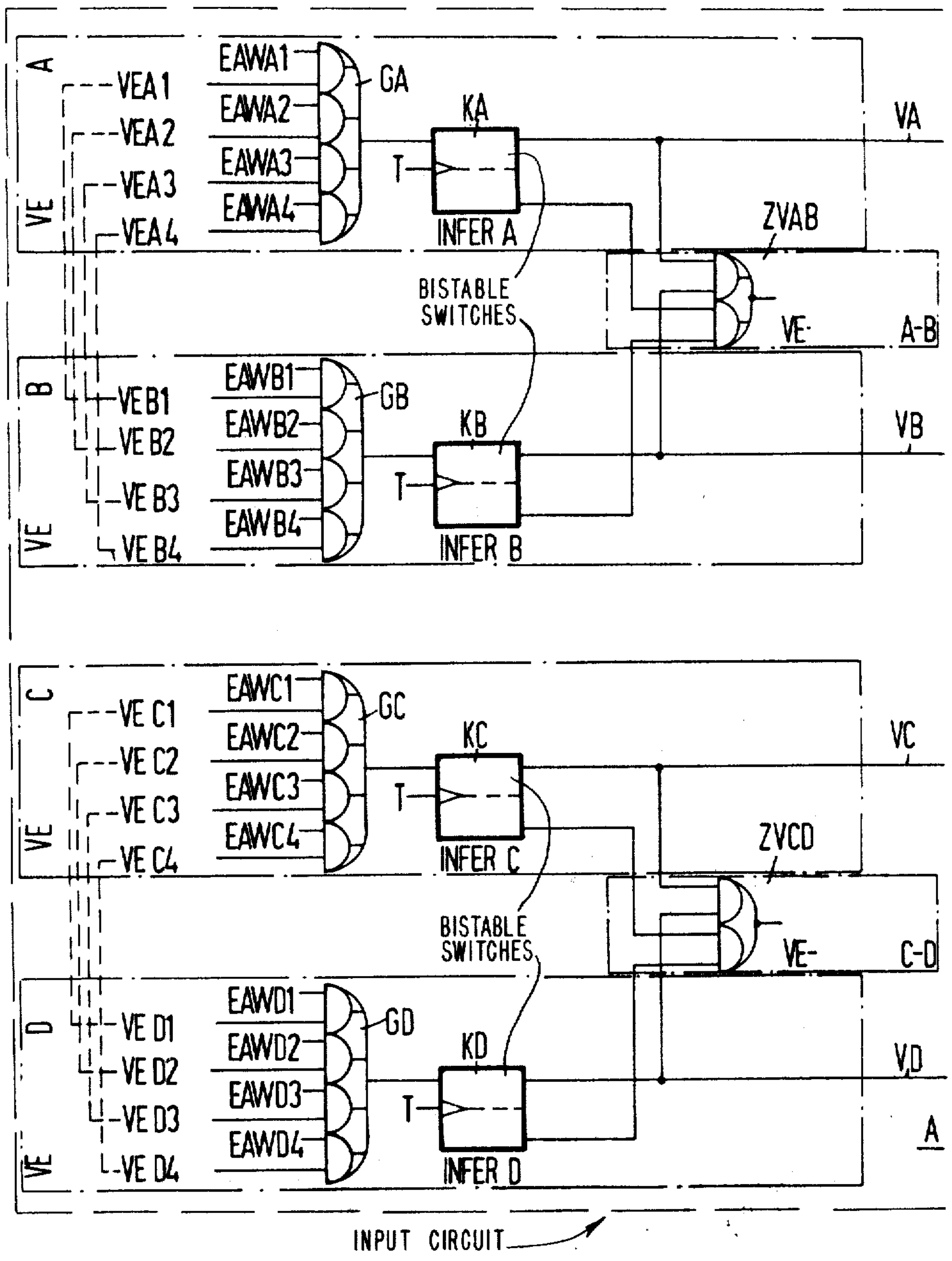
FIG. 6 consisting of FIGS. 6*a* and 6*b* is a circuit-technical working example of an input circuit.
Figure 6B:
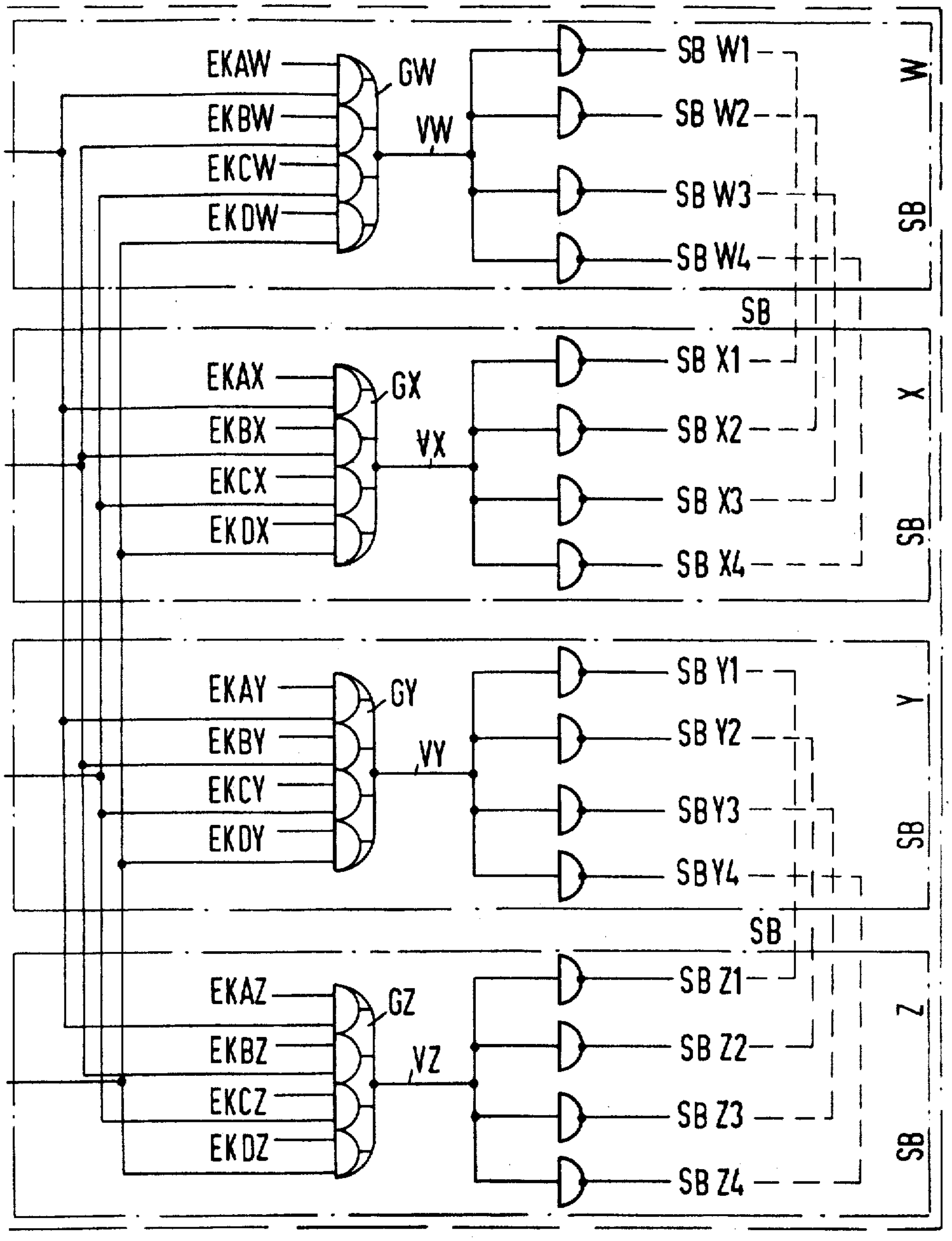

Now the shown working example according to FIG. 6 makes possible, in addition to the individual operation of all processing units VE and all storage sub-units SB, a parallel operation of several processing units VE as well as a parallel operation of several storage sub-units SB. In case of a disturbance the parallel operation of storage sub-units makes possible the continued operation of the entire system without the loss of information. The same is also true for the parallel operation of processing units VE. It is necessary in this connection that in each case the information exchange from and to the parallel-proceeding processing units and/or storage units is compared. For the purpose of comparison the central comparison units SVAB and SVCD are used to which in each case signals from connection paths VA and VB, or VC and VD are conveyed. Accordingly the same circuit arrangement is provided in output circuit B (compare FIG. 3 and FIG. 5) on the information path from the storage sub-units SB to the processing units VE. In this manner not only the proper operation of processing units VE and storage sub-units SB is supervised, but the internal paths and the control circuit are also included in the supervision. To flip flop stages KA, KB, KC, KD a signal is conveyed at the inlets during the operation interval of the storage input/output control SEAS (FIG. 3), through which the thereto-pertaining connection paths VA, VB, VC, VD are opened, after previously the through-connection of gates GA, GB, GC, GD was carried out.

In the shown working example according to FIG. 6 for example the processing units VEA1 and VEB1, of which only the connections are shown, can thus be switched parallel; also the processing units VEA2 and VEB2. Accordingly storage sub-units of which in each case only the inlets are marked, for example sub-units SBW1 and SBX1, as well as SBW2 and SBX2, etc., can be switched parallel.

We claim:

1. Program controlled telecommunication exchange system having a plurality of differently functioning processing units and at least one storage means containing data and programs necessary to the operation of said exchange, said processing units being individually connected to said storage means, comprising:
- a plurality of storage sub-unit means in said storage means,
- storage input and output control means in said storage means for controlling access to said storage means and to individual ones of said storage sub-units by each of said processing units, said storage input and output control means including means for controlling the selection and distribution of storage locations requested by said processing units in such a way that in several of said storage sub-unit means storage cycle proceed concurrently and in parallel, the beginnings of said storage cycles being spaced one from the other by a predetermined time interval,
- first information line means and first control line means connecting said processing units through said storage input and output control means to said storage sub-unit means and
- second information line means and second control line means connecting each of said storage sub-unit means through said storage input and output control means to said processing units.

2. The system defined in claim 1 further comprising:
- input circuit means in said storage input and output control means for coupling information signals from said processing units to said storage sub-unit means over said first information line means,
- output circuit means in said storage input and output control means for coupling information signals from said storage sub-unit means to said processing units over said second information line means,
- input control means in said storage input and output control means for coupling control signals from said processing units to said storage sub-unit means over said first control line means and
- output control means in said storage input and output control means for coupling control signals from said storage sub-unit means to said processing units over said second control line means.

3. The system defined in claim 2 wherein said input control means comprises:
- input selection circuit means and input destination circuit means,
- and wherein said output control means comprises:
- output selection circuit means and output destination circuit means,
- said processing units being connected to said input selection circuit means and said output destination circuit means by said first and second control lines, respectively, and said storage sub-units being connected to said input destination circuit means and said output selection circuit means by said first and second control lines, respectively.

4. The system defined in claim 1 further comprising output selection circuit means in said storage input and output control means over which a direct connection path is provided between said processing units and said storage sub-units.

5. The system defined in claim 1 further comprising means for establishing the connection path over an output circuit of said storage input-output control means between said storage sub-units and said storage input-output control means.

6. The system defined in claim 1 wherein said storage sub-unit means individually possess different operating cycle times.

7. The system defined in claim 6 further comprising:

input circuit means and output circuit means in said storage input-output control means, said processing units and said storage sub-units being connected in parallel, respectively, with said input circuit and output circuit means and comparison circuit means for executing signal comparisons between the connection paths through said input and output circuit means.

* * * * *